(12) United States Patent
Wang

(10) Patent No.: US 11,768,795 B2
(45) Date of Patent: Sep. 26, 2023

(54) THUNDERBOLT DEVICE MODULE AND ELECTRONIC DEVICE HAVING ROOT COMPLEX AND INTEGRATING WITH SUCH THUNDERBOLT DEVICE MODULE

(71) Applicant: PROMISE TECHNOLOGY, INC., Hsinchu County (TW)

(72) Inventor: Che-Jen Wang, Hsinchu County (TW)

(73) Assignee: PROMISE TECHNOLOGY, INC., Hsinchu County (TW)

( * ) Notice: Subject to any disclaimer, the term of this patent is extended or adjusted under 35 U.S.C. 154(b) by 0 days.

(21) Appl. No.: 17/539,420

(22) Filed: Dec. 1, 2021

(65) Prior Publication Data

US 2022/0179820 A1 Jun. 9, 2022

(30) Foreign Application Priority Data

Dec. 8, 2020 (TW) ................................ 109143141

(51) Int. Cl.
   *G06F 13/42* (2006.01)
(52) U.S. Cl.
   CPC .. *G06F 13/4282* (2013.01); *G06F 2213/0026* (2013.01)
(58) Field of Classification Search
   CPC ................... G06F 13/4282; G06F 2213/0026
   See application file for complete search history.

(56) References Cited

U.S. PATENT DOCUMENTS

| 2013/0151750 A1* | 6/2013 | Kanigicherla | G06F 13/4022 710/313 |
| 2013/0262883 A1* | 10/2013 | Saunders | G06F 1/325 713/300 |
| 2013/0332634 A1* | 12/2013 | Glaser | G06F 13/4286 710/104 |
| 2014/0075065 A1* | 3/2014 | Haeffner | G06F 3/0689 710/74 |
| 2018/0373609 A1* | 12/2018 | Beerens | G06F 11/3027 |
| 2019/0042510 A1* | 2/2019 | Ngau | G06F 13/4027 |

* cited by examiner

*Primary Examiner* — Henry Tsai
*Assistant Examiner* — Harry Z Wang
(74) *Attorney, Agent, or Firm* — MUNCY, GEISSLER, OLDS & LOWE, P.C.

(57) ABSTRACT

A thunderbolt device module is provided. The thunderbolt device module of the invention includes a first interface protocol component, a thunderbolt controller and a second interface protocol component. A root complex of an electronic device is via a bus, conforming to a PCIe interface protocol, directly or indirectly electrically coupled to the second interface protocol component. The first interface protocol component and the second interface protocol component both conform to a predetermined interface protocol. In particular, the predetermined interface protocol is not the PCIe interface protocol, but supports the PCIe interface protocol. The thunderbolt controller is electrically coupled to the first interface protocol component. The second interface protocol component is electrically coupled to the first interface protocol component. The communication between the second interface protocol component and the first interface protocol component conforms to the predetermined interface protocol.

3 Claims, 5 Drawing Sheets

THUNDERBOLT DEVICE MODULE AND ELECTRONIC DEVICE HAVING ROOT COMPLEX AND INTEGRATING WITH SUCH THUNDERBOLT DEVICE MODULE

CROSS-REFERENCE TO RELATED APPLICATION

This utility application claims priority to Taiwan Application Serial Number 109143141, filed Dec. 8, 2020, which is incorporated herein by reference.

BACKGROUND OF THE INVENTION

1. Field of the Invention

The invention relates to a thunderbolt device module and an electronic device having a root complex and integrating with such thunderbolt device module.

2. Description of the Prior Art

"Thunderbolt" is a high-speed interface protocol published by Intel, which can transmit data at 40 Gbit/s in bi-direction. The thunderbolt interface protocol has the characteristics of fast data transmission speed and diversified functions. The thunderbolt interface protocol combines data transmission in PCIe (peripheral component interface express) interface protocol and image streaming in display port into two serial signals. The thunderbolt interface protocol allows two channels to be simultaneously provided in the same cable to transmit data and image streams respectively. Therefore, the thunderbolt interface protocol can be used as a universal connection interface protocol between computers and other peripheral devices.

The available connection types using the thunderbolt interface protocol include two types: host-to-host and host-to-device. The thunderbolt interface protocol defines hardware to be divided into two modes: host and device. For the host-to-device connection type, the thunderbolt interface protocol uses the PCIe interface protocol to transmit data. The PCIe interface protocol is a high-speed protocol used by computer components to transmit data between each other. The PCIe interface protocol defines three types of components: root complexes, bridge/switch components, and endpoint components. Root complexes are usually used in hosts. In a PCIe domain, there is only one root complex. The central processing unit, system memory, graphics driver, etc. are all connected to the root complex equivalent to the PCIe host. Due to the point-to-point feature of the PCIe interface protocol, the system must use bridging/switching components to increase the number of system functions. In addition, the PCIe bridging/switching component connects the root complex at the upstream end to the endpoint component at the downstream end.

In order to connect two root complexes, special functional components are required, for example, special PCIe bridge/switch components with a non-transparent bridge (NTB) function or a special root complexes.

Please refer to FIG. 1, FIG. 1 is a schematic diagram of a target device 1 of a prior art conforming to the device mode of the thunderbolt interface protocol and a host 2 connected via a thunderbolt cable 27 to the target device 1. As shown in FIG. 1, the target device 1 of the prior art includes a processor 10, a thunderbolt controller 12 and a port 14. The processor 10 is electrically coupled to the thunderbolt interface controller 12 via a local bus 11. The communication between the processor 10 and the thunderbolt controller 12 through the local bus 11 conforms to the PCIe interface protocol. The thunderbolt controller 12 is electrically connected to the connection port 14 via a local bus 13. The host 2 includes a host processor 20, a root complex 22, a thunderbolt controller 24, and a port 26. The root complex 22 is electrically coupled to the host processor 20 via a local bus 21. The thunderbolt controller 24 is electrically coupled to the root complex 22 via a local bus 23. The port 26 is electrically coupled to the thunderbolt controller 24 via a local bus 25. The thunderbolt cable 27 can physically connect the port 14 and the port 26. The host 2 can communicate with the target device 1 through the thunderbolt controller 24, the thunderbolt cable 27, and the thunderbolt controller 12. The communication between the host 2 and the target device 1 conforms to the PCIe interface protocol.

The target device 1 of the prior art shown in FIG. 1 is currently widely used in the market due to the simple architecture of the target device 1. However, the processor 10 of the target device 1 of the prior art is a PCIe endpoint component, that is, the processor 10 is a chip without a root complex. Therefore, the functions of the target device 1 of the prior art are limited by the adopted system chip, and lack scalability and flexibility.

Please refer to FIG. 2, FIG. 2 is a schematic diagram of a target device 3 of another prior art conforming to the device mode of the thunderbolt interface protocol and the host 2 connected via the thunderbolt cable 27 to the target device 3. As shown in FIG. 2, the target device 3 of another prior art includes a processor 30, a root complex 32, a bridge/switch component 34, a thunderbolt controller 36 and a port 38. In particular, the bridge/switch component 34 is a special bridge/switch component 34, which must have an NTB function. The processor 30 is electrically coupled to the root complex 32 via a local bus 31. The root complex 32 is electrically coupled to the bridge/switch component 34 via a local bus 33. The bridge/switch component 34 is electrically coupled to the thunderbolt controller 36 via the local bus 35. The thunderbolt controller 36 is electrically coupled to the port 38 via the local bus 37. The communication between the processor 30 and the thunderbolt controller 36 through the local bus 31, the root complex element 32, the local bus 33, the bridge/switch element 34 and the local bus 35 conforms to the PCIe interface protocol. Similarly, the thunderbolt cable 27 can physically connect the port 38 of the target device 3 and the port 26 of the host 2. The communication between the host 2 and the target device 3 conforms to the PCIe interface protocol. The architecture of the host 2 shown in FIG. 2 is the same as that of the host 2 shown in FIG. 1, and will not be described in detail herein.

Please refer to FIG. 3. FIG. 3 is a schematic diagram of a target device 4 of another prior art conforming to the device mode of the thunderbolt interface protocol and the host 2 connected via the thunderbolt cable 27 to the target device 4. As shown in FIG. 3, the target device 4 of another prior art includes a processor 40, a root complex 42, a thunderbolt controller 44 and a port 46. In particular, the root complex 42 is one of special root complexes, which must have the NTB function. The processor 40 is electrically coupled to the root complex 42 via a local bus 41. The root complex 42 is electrically coupled to the thunderbolt controller 44 via a local bus 43. The thunderbolt controller 44 is electrically coupled to the port 46 via a local bus 45. The communication between the processor 40 and the thunderbolt controller 44 through the local bus 41, the root complex 42 and the local bus 43 conforms to the PCIe interface protocol. Similarly, the thunderbolt cable 27 can physically connect the port 46 and the port 26 of the host 2. The communication between the host 2 and the target device 4 conforms to the PCIe interface protocol. The architecture of the host 2 shown in FIG. 3 is the same as that of the host 2 shown in FIG. 1, and will not be described in detail herein.

The target device 3 of the prior art shown in FIG. 2 and the target device 4 prior art shown in FIG. 3 are rarely seen in the market because they require special components with NTB functions, as well as special configurations and drivers to enable PCIe communication to operate normally. But, the target device 3 of the prior art shown in FIG. 2 and the target device 4 of the prior art shown in FIG. 3 have more functions because they have their own PCIe domains, their functions can be expanded. In terms of performance considerations, the target device 3 of the prior art shown in FIG. 2 and the target device 4 of the prior art shown in FIG. 3 also require an additional direct memory access (DMA) controller to perform data transmission between the two PCIe domains.

At present, there is no target device, conforming to the device mode of the thunderbolt interface protocol, whose architecture allows itself to have scalability and flexibility without the need of special components with NTB functions, special drivers, and additional DMA controllers.

SUMMARY OF THE INVENTION

Accordingly, one scope of the invention is to provide a thunderbolt device module and an electronic device having a root complex and integrating with such thunderbolt device module. The electronic device according to the invention conforms to the device mode of the thunderbolt interface protocol, and has scalability and flexibility without the need of special components with NTB functions, special drivers, and additional DMA controllers.

A thunderbolt device according to a first preferred embodiment of the invention is capable of being integrated with an electronic device. The electronic device includes a target device processor, a first root complex and a first connector. The target device processor is electrically coupled to the first root complex. The first root complex is electrically coupled to the first connector via a first bus. The first bus conforms to a PCIe interface protocol. The thunderbolt device module according to the first preferred embodiment of the invention includes a first interface protocol component, a first thunderbolt controller, a first port, a second interface protocol component, and a second connector. The first interface protocol component conforms to a predetermined interface protocol. The predetermined interface protocol is not the PCIe interface protocol, and supports the PCIe interface protocol. The first thunderbolt controller is electrically coupled to the first interface protocol component. A first communication between the first thunderbolt controller and the first interface protocol component conforms to the PCIe interface protocol. The first port is electrically coupled to the first thunderbolt controller. The second interface protocol component is electrically coupled to the first interface protocol component, and conforms to the predetermined interface protocol. A second communication between the second interface protocol component and the first interface protocol component conforms to the predetermined interface protocol. The second connector is electrically coupled to the second interface protocol component, and configured to mate with the first connector. A third communication between the second interface protocol component and the target device processor conforms to the PCIe interface protocol through the second connector, the first connector, the first bus, and the first root complex.

An electronic device according to a second preferred embodiment of the invention includes a target device processor, a first root complex and a thunderbolt device module. The first root complex is electrically coupled to the target device processor. The thunderbolt device module includes a first interface protocol component, a first thunderbolt controller, a first port, and a second interface protocol component. The first interface protocol component conforms to a predetermined interface protocol. The predetermined interface protocol is not a PCIe interface protocol, and supports the PCIe interface protocol. The first thunderbolt controller is electrically coupled to the first interface protocol component. A first communication between the first thunderbolt controller and the first interface protocol component conforms to the PCIe interface protocol. The first port is electrically coupled to the first thunderbolt controller. The second interface protocol component is electrically coupled to the first interface protocol component, and conforms to the predetermined interface protocol. A second communication between the second interface protocol component and the first interface protocol component conforms to the predetermined interface protocol. The first root complex is electrically coupled to the second interface protocol component via a first bus. The first bus conforms to the PCIe interface protocol. A third communication between the second interface protocol component and the target device processor conforms to the PCIe interface protocol through the first bus and the first root complex.

In one embodiment, the predetermined interface protocol can be a SAS (serial attached small computer system interface) interface protocol, an Ethernet interface protocol, a SATA (serial advanced technology attachment) interface protocol, a fibre channel interface protocol or other non-PCIe interface protocol but supporting the PCIe interface protocol.

In one embodiment, the electronic device according to the invention is capable of being connected to a host. The host includes a host processor, a second root complex, a second thunderbolt controller, and a second port. The second root complex is electrically coupled to the host processor. The second thunderbolt controller is electrically coupled to the second root complex via a second bus. The second bus conforms to the PCIe interface protocol. The second port is electrically coupled to the second thunderbolt controller. A thunderbolt cable is capable of physically connecting the first port and the second port. The host is capable of communicating with the electronic device through the second thunderbolt controller, the thunderbolt cable, and the first thunderbolt controller Compared to the prior arts, the electronic device according to the invention not only conforms to the device mode of the thunderbolt interface protocol, but also has scalability and flexibility without the need of special components with NTB functions, special drivers, and additional DMA controllers.

The advantage and spirit of the invention may be understood by the following recitations together with the appended drawings.

BRIEF DESCRIPTION OF THE APPENDED DRAWINGS

DETAILED DESCRIPTION OF THE INVENTION

Some preferred embodiments and practical applications of this present invention would be explained in the following paragraph, describing the characteristics, spirit, and advantages of the invention.

Figure 4:
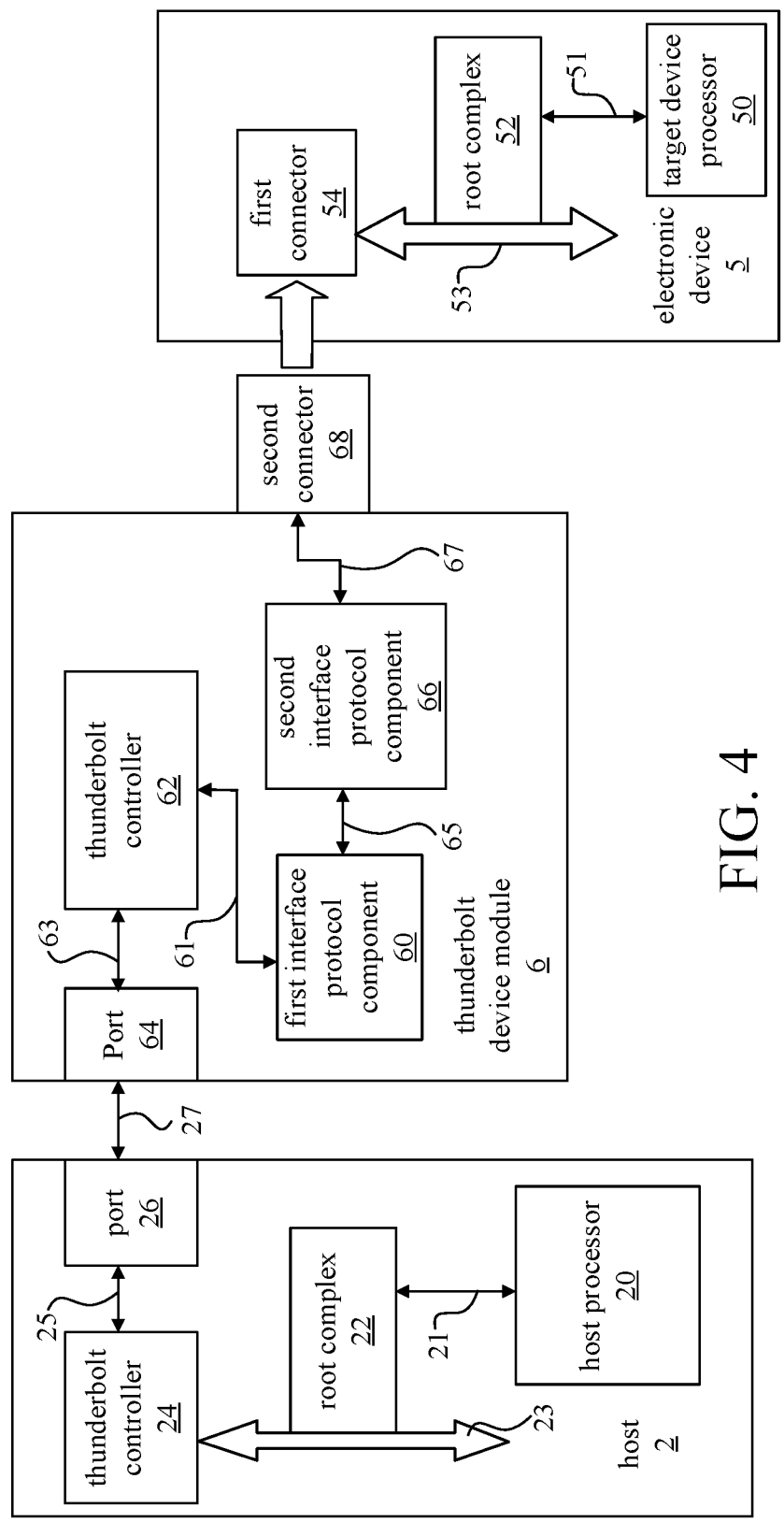
FIG. 4 is a schematic diagram of an architecture of a thunderbolt device module according to the first preferred embodiment of the invention, an electronic device integrating with the thunderbolt device module and a host connected via a thunderbolt cable to the electronic device.

Referring to FIG. 4, the architecture of a thunderbolt device module 6 according to the first preferred embodiment of the invention and an electronic device 5 integrating with the thunderbolt device module 6 is schematically illustrated in FIG. 4.

As shown in FIG. 4, the electronic device 5 includes a target device processor 50, a root complex 52 and a first connector 54. The target device processor 50 is electrically coupled to the root complex 52 via a local bus 51. The root complex 52 is electrically coupled to the first connector 54 via a local bus 53. In particular, the local bus 53 conforms to the PCIe interface protocol.

The thunderbolt device module 6 according to the first preferred embodiment of the invention includes a first interface protocol component 60, a first thunderbolt controller 62, a port 64, a second interface protocol component 66, and a second connector 68. The first interface protocol component 60 conforms to a predetermined interface protocol. In particular, the predetermined interface protocol is not the PCIe interface protocol, and supports the PCIe interface protocol.

The first thunderbolt controller 62 is electrically coupled to the first interface protocol component 60 via a local bus 61. The communication between the first thunderbolt controller 62 and the first interface protocol component 60 conforms to the PCIe interface protocol.

The port 64 is electrically coupled to the first thunderbolt controller 62 via a local bus 63. The second interface protocol component 66 is electrically coupled to the first interface protocol component 60 via a local bus 65, and conforms to the predetermined interface protocol. The communication between the second interface protocol component 66 and the first interface protocol component 60 conforms to the predetermined interface protocol.

The second connector 68 is electrically coupled to the second interface protocol component 66 via a local bus 67, and configured to mate with the first connector 54. The communication between the second interface protocol component 66 and the target device processor 50 conforms to the PCIe interface protocol through the second connector 68, the first connector 54, the first bus, and the root complex 52.

Figure 1:
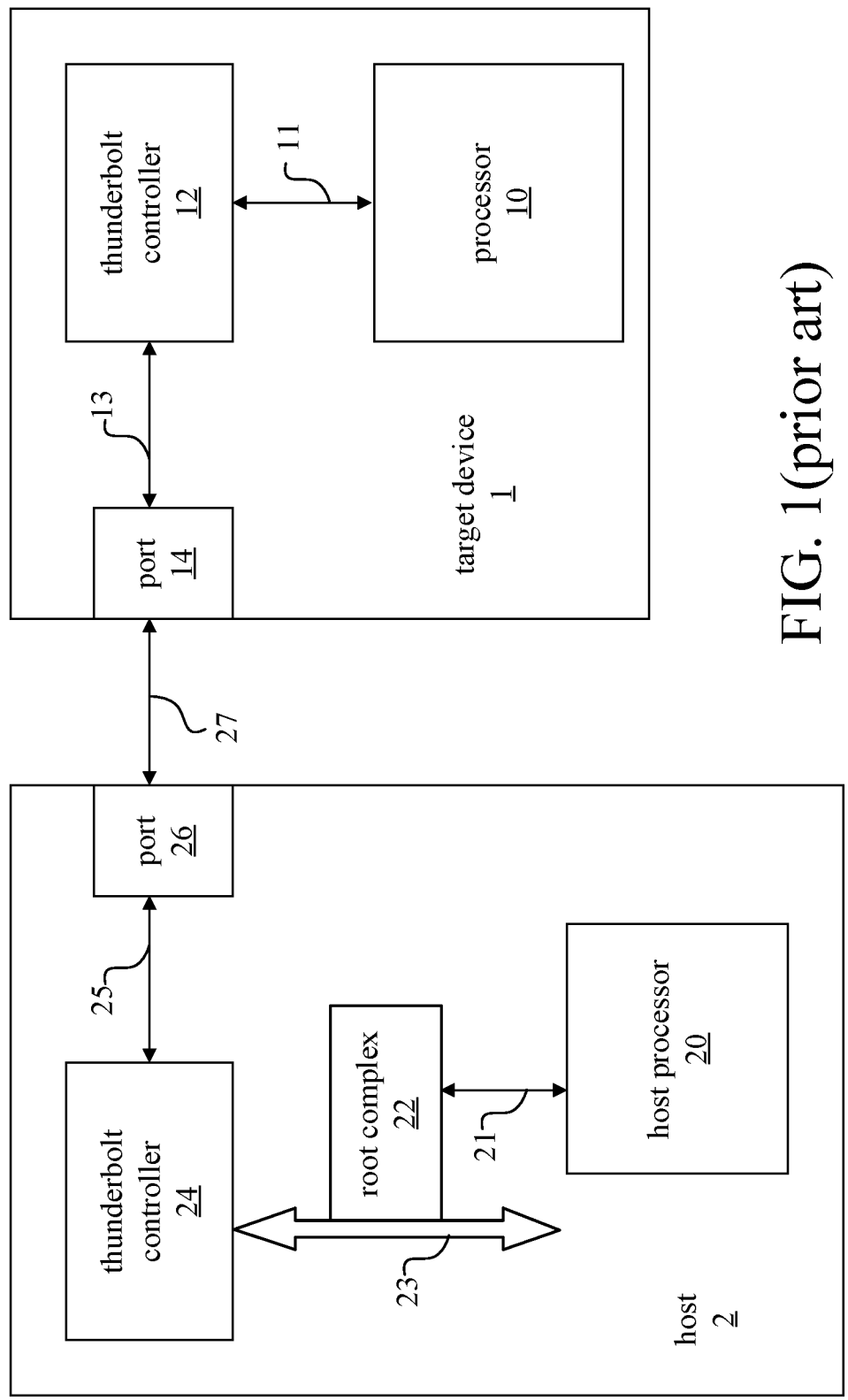
FIG. 1 is a schematic diagram of an architecture of a target device a prior art conforming to the device mode of the thunderbolt interface protocol and a host connected via a thunderbolt cable to the target device.
Figure 2:
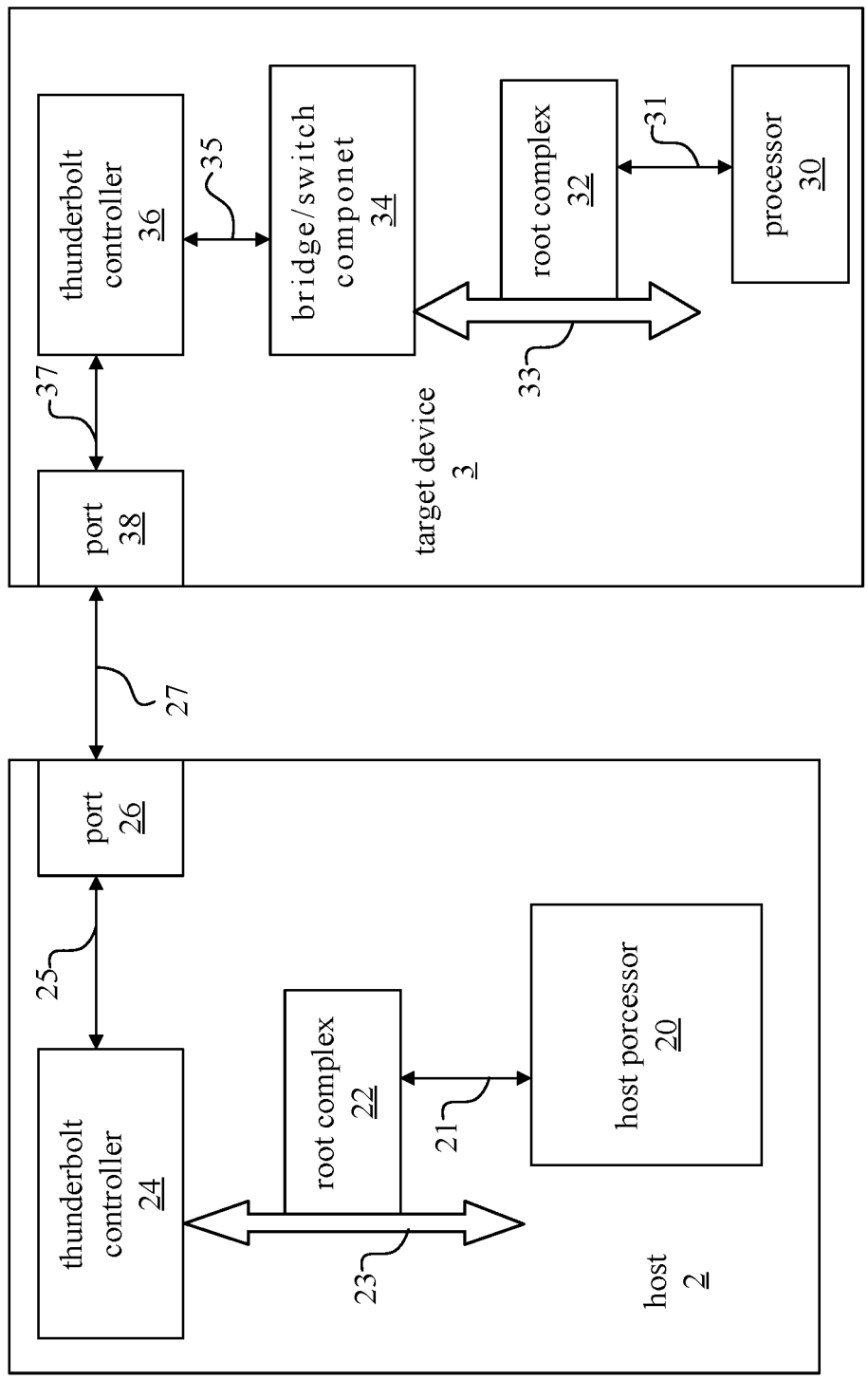
FIG. 2 is a schematic diagram of an architecture of a target device of another prior art conforming to the device mode of the thunderbolt interface protocol and the host connected via the thunderbolt cable to the target device.
Figure 3:
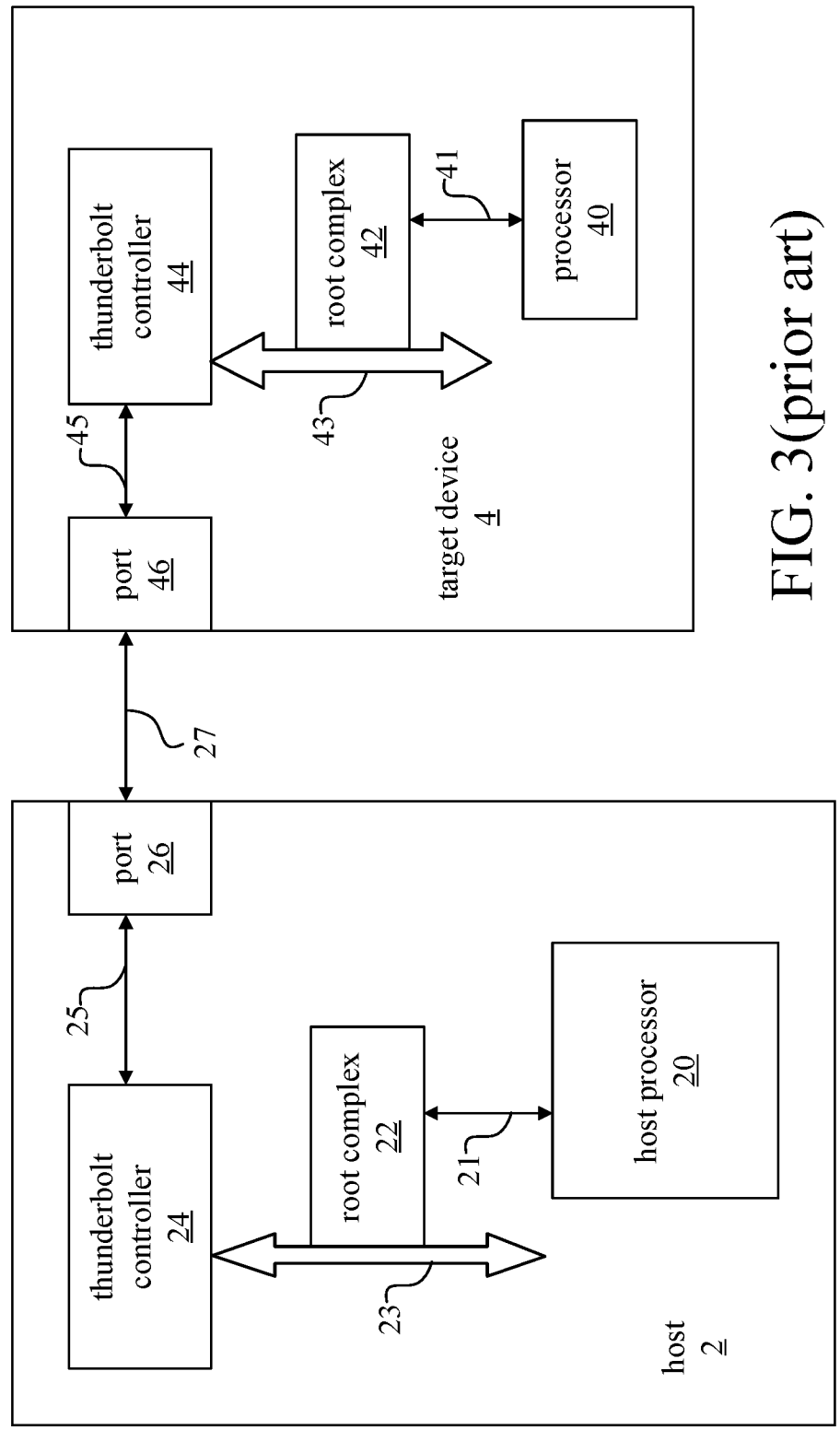
FIG. 3 is a schematic diagram of an architecture of a target device of another prior art conforming to the device mode of the thunderbolt interface protocol and the host connected via the thunderbolt cable to the target device.

Similarly, the thunderbolt cable 27 can physically connect the port 64 of the thunderbolt device module 6, according to the first preferred embodiment of the invention, integrated with the electronic device 5 and the port 26 of the host 2. The communication between the host 2 and the electronic device 5 conforms to the thunderbolt interface protocol. The architecture of the host 2 shown in FIG. 4 is the same as that of the host 2 shown in FIG. 1, and will not be described in detail herein.

In one embodiment, the first connector 54 is a socket type connector, and the second connector 68 is a golden finger type connector, but the invention is not limited to these.

In one embodiment, the predetermined interface protocol can be a SAS (serial attached small computer system interface) interface protocol, an Ethernet interface protocol, a SATA (serial advanced technology attachment) interface protocol, a fibre channel interface protocol or other non-PCIe interface protocol but supporting the PCIe interface protocol. The first interface protocol component 60 and the second interface protocol component 66 that conform to the mentioned-above interface protocols have been developed for a long time, and drivers for various device functions of the first interface protocol component 60 and the second interface protocol component 66 all are ready. Therefore, the use of the first interface protocol component 60 and the second interface protocol component 66 that conform to the mentioned-above interface protocols does not require the development of special drivers. Moreover, the first interface protocol component 60 and the second interface protocol component 66 that conform to the mentioned-above interface protocols usually have their own DMA controllers. Therefore, the electronic device 5 integrating with the thunderbolt device module 6 according to the first preferred embodiment of the invention does not require an additional DMA controller.

The thunderbolt device module 6 according to the first preferred embodiment of the invention can be integrated with any electronic device 5 that includes PCIe root complex 52, and then the electronic device 5 can be converted into a target device conforming to the device mode of the thunderbolt interface protocol. Moreover, the thunderbolt device module 6 according to the first preferred embodiment of the invention has no special requirements for the electronic device 5 integrating with the thunderbolt device module 6. The thunderbolt device module 6 according to the first preferred embodiment of the invention can operate on any electronic device 5 including PCIe root complex 52. Obviously, the electronic device 5 integrating with the thunderbolt device module 6 according to the first preferred embodiment of the invention has scalability and flexibility.

Figure 5:
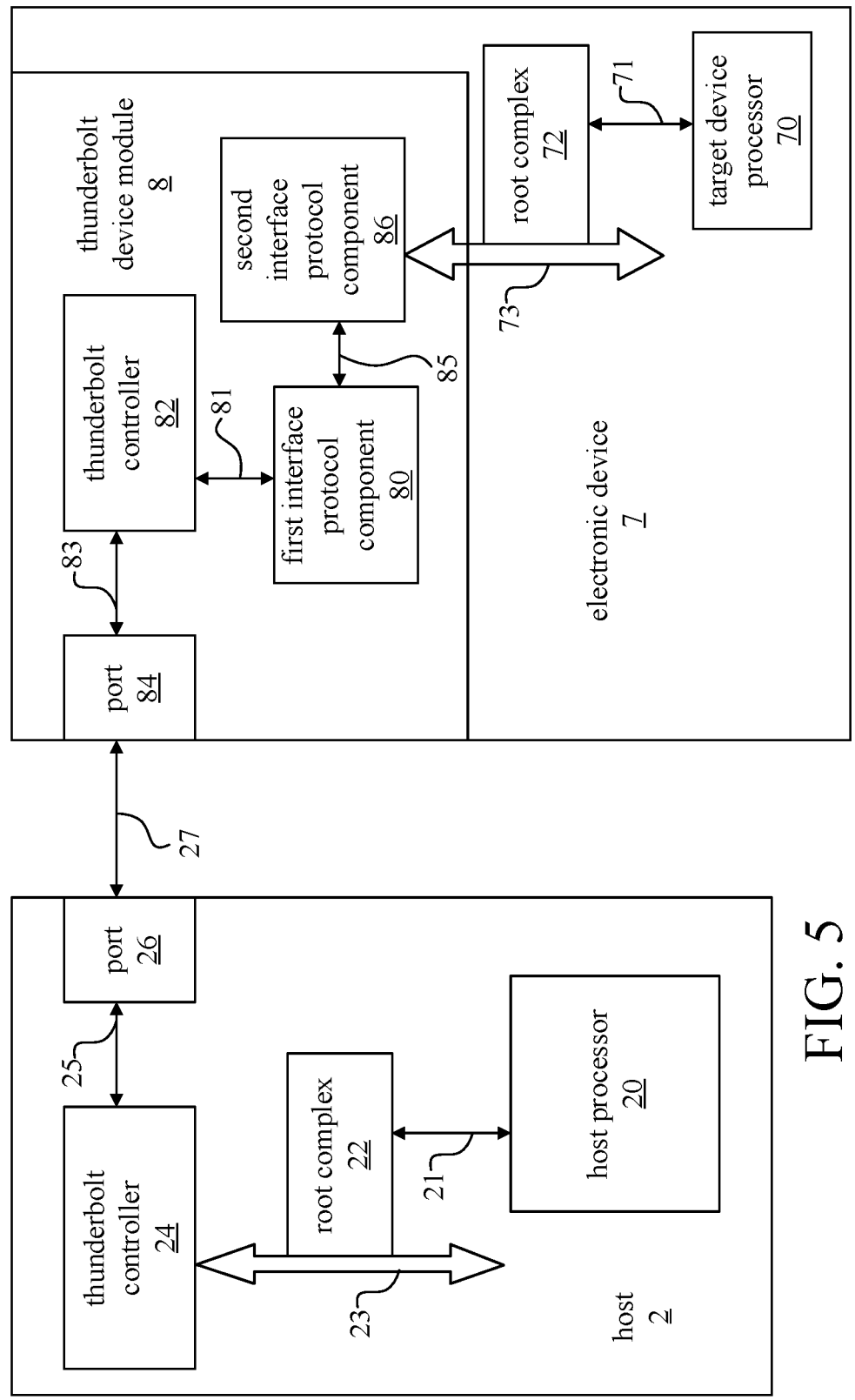
FIG. 5 is a schematic diagram of an architecture of an electronic device according to the second preferred embodiment of the invention, a thunderbolt device module integrated with the electronic device, and a host connected via a thunderbolt cable to the electronic device.

Referring to FIG. 5, the architecture of an electronic device 7 according to the second preferred embodiment of the invention is schematically illustrated in FIG. 5.

As shown in FIG. 5, the electronic device 7, according to the second preferred embodiment of the invention, integrates with a thunderbolt device module 8, and includes a target device processor 70, a root complex 72 and the thunderbolt device module 8. The root complex 72 is electrically coupled to the target device processor 70 via a local bus 71. In particular, the local bus 71 conforms to the PCIe interface protocol.

The thunderbolt device module 8 includes a first interface protocol component 80, a thunderbolt controller 82, a port 84, and a second interface protocol component 86. The first interface protocol component 80 conforms to a predetermined interface protocol. In particular, the predetermined interface protocol is not a PCIe interface protocol, and supports the PCIe interface protocol.

The thunderbolt controller 82 is electrically coupled to the first interface protocol component 80 via a local bus 81. The communication between the thunderbolt controller 82 and the first interface protocol component 80 conforms to the PCIe interface protocol.

The port 84 is electrically coupled to the thunderbolt controller 82 via a local bus 83. The second interface protocol component 86 is electrically coupled to the first interface protocol component 80 via a local bus 85, and conforms to the predetermined interface protocol. The communication between the second interface protocol component 86 and the first interface protocol component 80 conforms to the predetermined interface protocol.

The root complex 72 is electrically coupled to the second interface protocol component 86 via a local bus 73. The local bus 73 conforms to the PCIe interface protocol. The communication between the second interface protocol component 86 and the target device processor 70 conforms to the PCIe interface protocol through the local bus 73 and the root complex 72.

Similarly, the thunderbolt cable 27 can physically connect the port 84 of the electronic device 7 according to the second preferred embodiment of the invention and the port 26 of the host 2. The communication between the host 2 and the electronic device 7 according to the second preferred embodiment of the invention conforms to the thunderbolt interface protocol. The architecture of the host 2 shown in FIG. 5 is the same as that of the host 2 shown in FIG. 1, and will not be described in detail herein.

In one embodiment, the predetermined interface protocol can be a SAS (serial attached small computer system interface) interface protocol, an Ethernet interface protocol, a SATA (serial advanced technology attachment) interface protocol, a fibre channel interface protocol or other non-PCIe interface protocol but supporting the PCIe interface protocol. The first interface protocol component 80 and the second interface protocol component 86 that conform to the mentioned-above interface protocols have been developed for a long time, and drivers for various device functions of the first interface protocol component 60 and the second interface protocol component 66 all are ready. Therefore, the use of the first interface protocol component 60 and the second interface protocol component 66 that conform to the mentioned-above interface protocols does not require the development of special drivers. Moreover, the first interface protocol component 80 and the second interface protocol component 86 that conform to the mentioned-above interface protocols usually have their own DMA controllers. Therefore, the electronic device 7 according to the second preferred embodiment of the invention does not require an additional DMA controller.

The thunderbolt device module 8 according to the second preferred embodiment of the invention can be integrated in any electronic device 7 that includes PCIe root complex 72, and then the electronic device 7 can be converted into a target device conforming to the device mode of the thunderbolt interface protocol. Moreover, the thunderbolt device module 8 according to the second preferred embodiment of the invention has no special requirements for the electronic device 7 integrating with the thunderbolt device module 8. The thunderbolt device module 8 according to the second preferred embodiment of the invention can operate on any electronic device 7 including PCIe root complex 72. Obviously, the electronic device 7 according to the second preferred embodiment of the invention has scalability and flexibility.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A thunderbolt device module, capable of being integrated with an electronic device, the electronic device comprising a target device processor, a first root complex and a first connector, the target device processor being electrically coupled to the first root complex, the first root complex being electrically coupled to the first connector via a first bus, the first bus conforming to a PCIe (peripheral component interface express) interface protocol, said thunderbolt device module comprising:

a first interface protocol component, conforming to a predetermined interface protocol, wherein the predetermined interface protocol is not the PCIe interface protocol, and supports the PCIe interface protocol, the predetermined interface protocol is one selected from the group consisting of a SAS (serial attached small computer system interface) interface protocol, an Ethernet interface protocol, a SATA (serial advanced technology attachment) interface protocol, and a fibre channel interface protocol;

a first thunderbolt controller, electrically coupled to the first interface protocol component, a first communication between the first thunderbolt controller and the first interface protocol component conforming to the PCIe interface protocol;

a first port, electrically coupled to the first thunderbolt controller;

a second interface protocol component, being electrically coupled to the first interface protocol component and conforming to the predetermined interface protocol, a second communication between the second interface protocol component and the first interface protocol component conforming to the predetermined interface protocol; and a second connector, electrically coupled to the second interface protocol component and configured to mate with the first connector, wherein a third communication between the second interface protocol component and the target device processor conforms to the PCIe interface protocol through the second connector, the first connector, the first bus, and the first root complex, wherein the electronic device is capable of being connected to a host, the host comprises:

a host processor;

a second root complex, electrically coupled to the host processor;

a second thunderbolt controller, electrically coupled to the second root complex via a second bus, the second bus conforming to the PCIe interface protocol; and a second port, electrically coupled to the second thunderbolt controller, wherein a thunderbolt cable is capable of physically connecting the first port and the second port, the host is capable of communicating with the electronic device through the second thunderbolt controller, the thunderbolt cable, and the first thunderbolt controller.

2. The thunderbolt device module of claim 1, wherein the first connector is a socket type connector, and the second connector is a golden finger type connector.

3. An electronic device, comprising:
- a target device processor;
- a first root complex, electrically coupled to the target device processor; and
- a thunderbolt device module, comprising:
  - a first interface protocol component, conforming to a predetermined interface protocol, wherein the predetermined interface protocol is not a PCIe (peripheral component interface express) interface protocol, and supports the PCIe interface protocol, the predetermined interface protocol is one selected from the group consisting of a SAS (serial attached small computer system interface) interface protocol, an Ethernet interface protocol, a SATA (serial advanced technology attachment) interface protocol, and a fibre channel interface protocol;
  - a first thunderbolt controller, electrically coupled to the first interface protocol component, a first communication between the first thunderbolt controller and the first interface protocol component conforming to the PCIe interface protocol;
  - a first port, electrically coupled to the first thunderbolt controller; and
  - a second interface protocol component, being electrically coupled to the first interface protocol component and conforming to the predetermined interface protocol, a second communication between the second interface protocol component and the first interface protocol component conforming to the predetermined interface protocol, wherein the first root complex is electrically coupled to the second interface protocol component via a first bus, the first bus conforms to the PCIE interface protocol, a third communication between the second interface protocol component and the target device processor conforms to the PCIe interface protocol through the first bus and the first root complex,
- wherein said electronic device is capable of being connected to a host, the host comprises:
- a host processor;
- a second root complex, electrically coupled to the host processor;
- a second thunderbolt controller, electrically coupled to the second root complex via a second bus, the second bus conforming to the PCIe interface protocol; and
- a second port, electrically coupled to the second thunderbolt controller, wherein a thunderbolt cable is capable of physically connecting the first port and the second port, the host is capable of communicating with the electronic device through the second thunderbolt controller, the thunderbolt cable, and the first thunderbolt controller.

* * * * *